May 29, 1928.
A. N. ERICKSON
1,671,183
METHOD OF PRODUCING A SOLUTION OF CYANAMIDE FROM CALCIUM CYANAMIDE
Filed April 20, 1927
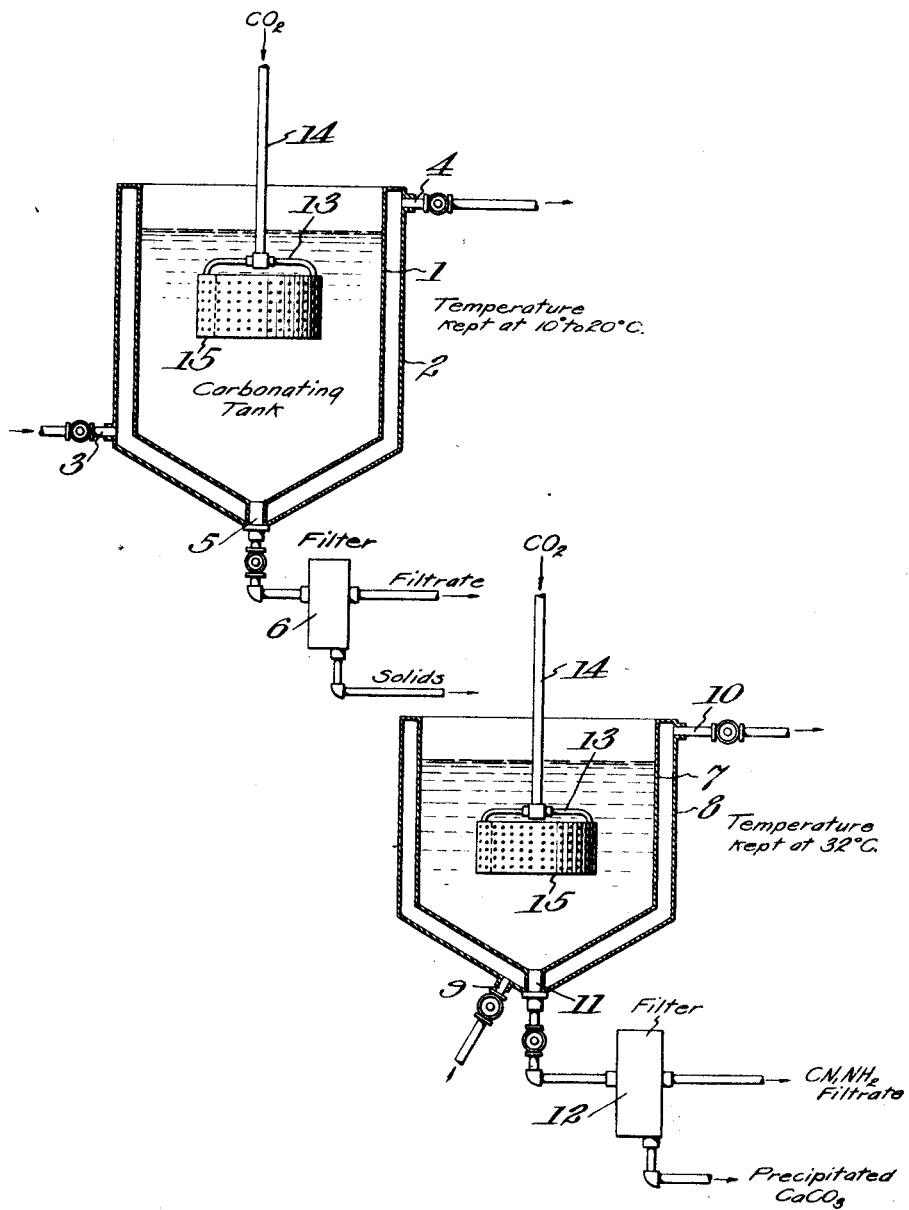

Patented May 29, 1928.

1,671,183

UNITED STATES PATENT OFFICE.

ALBERT N. ERICKSON, OF ELMHURST, NEW YORK, ASSIGNOR TO UNION CARBIDE COMPANY, A CORPORATION OF VIRGINIA.

METHOD OF PRODUCING A SOLUTION OF CYANAMIDE FROM CALCIUM CYANAMIDE.

Application filed April 20, 1927. Serial No. 185,285.

This invention is a new method of producing a solution of cyanamide from calcium cyanamide, and in particular to the production of cyanamide solutions substantially free from dicyandiamide for use in the manufacture of urea.

Unless special precautions are taken in preparing cyanamide solutions from calcium cyanamide large percentages of the cyanamide will be converted into dicyandiamide. Since this latter compound has a harmful effect on plants and can neither be readily converted into urea nor be readily separated therefrom nor from the cyanamide solution prior to the conversion, by the usual hydrolizing methods, of the cyanamide contained therein to urea, it gives rise to an objectionable impurity in the final urea product. Also, the yield of urea from a given amount of calcium cyanamide is, of course, reduced to the extent that dicyandiamide is formed.

It has been proposed to prepare cyanamide solutions substantially free from dicyandiamide by controlling the alkalinity of the solution during the period in which the lime content of the calcium cyanamide is being separated therefrom and at the same time subjecting the solution to moderate cooling. Such processes for controlling the alkalinity of the solution involve the gradual introduction of calcium cyanamide into an aqueous solution while at the same time introducing carbon dioxide under conditions adapted to bring about the rapid precipitation of the lime content of the calcium cyanamide. To conduct the operation in a practicable manner it has been found necessary to introduce various pumps and other moving parts into the apparatus and these involve considerable expenditure for repairs and replacement, as well as of power in operating the same.

I have found that the formation of cyanamide solutions from calcium cyanamide is not dependent upon such close control of the alkalinity of the solution as heretofore has been thought necessary provided certain precautions as to the control of temperature and other factors are observed. My investigations show that the temperatures relatively low as compared with those previously thought feasible during the hydration and carbonation of calcium cyanamide the formation of an insoluble carbonated compound of nitrogen and lime is promoted while at the same time the reactions resulting in the formation of dicyandiamide on the one hand and cyanamide on the other proceed very slowly. This is true even when the solution shows relatively high alkalinity. I have further found that when this insoluble lime-nitrogen compound is moderately heated in the presence of carbon dioxide it is decomposed, the lime content being precipitated as calcium carbonate and the nitrogen content being converted into cyanamide substantially free from dicyandiamide. It thus becomes possible to so conduct the process that a whole charge or batch of calcium cyanamide may be introduced at once into the required amount of water and the resulting solution or mixture treated with carbon dioxide until all of the lime and nitrogen are precipitated as calcium carbonate and an insoluble lime-nitrogen compound.

The invention has for an object the preparation of cyanamide solutions substantially free from dicyandiamide and to thereby make it possible to produce urea of a high degree of purity. A further object is to eliminate the more or less complicated pumping and mixing apparatus heretofore required and to reduce operating costs. Other objects will appear from the following description and drawing, in which latter is shown a more or less diagrammatic view of an apparatus adapted to be used in carrying out the invention.

In the drawing 1 is the carbonating tank which is provided with a jacket 2 having an inlet 3 and an outlet 4 for the circulation of a cooling liquid. The jacket is preferably open at the top so that ice may be introduced to increase the effectiveness of the cooling liquid. The tank 1 is provided with an outlet 5 leading to a suitable filter 6. From the filter 6 the solids, consisting of the calcium carbonate precipitated in the carbonating tank 1 and the insoluble lime-nitrogen compound, are led to the tank 7 which, similarly to tank 1, is provided with a jacket 8 having an inlet 9 and an outlet 10 for the circulation of a suitable fluid heating medium. If the space between the jacket and the tank is filled with water, steam may be injected through suitable connections, not shown, to raise the temperature of the bath to the point where decomposition of the lime-nitrogen compound will be initiated. When the decomposition of the lime-nitrogen compound is complete the resulting slurry is drawn off through the outlet 11 and passed through the filter 12 to separate the cyanamide solution from the precipitated calcium carbonate. Carbon dioxide is supplied to the tanks 1 and 7 by means of injectors 13 which comprise a gas supply pipe 14 leading to a hollow annular member 15 having perforated or porous side walls. A porous material which has been found especially suitable for such side walls is Filtros. An injector 13 is supported above either tank as desired by any suitable means not shown so that it may be dipped into the solution and withdrawn at will. This flexibility or movability of the injector 13 gives it marked advantages over injecting means which form a part of the treating tank, particularly with respect to the greater ease with which the perforations or pores may be cleaned and opened if they become clogged by solids in the solution.

According to the present process water in the proportion of about 0.7 gallon for each pound of commercial calcium cyanamide to be treated is introduced into the tank 1. The whole charge or batch of calcium cyanamide is then added. Carbon dioxide is then passed into the solution until no more free lime is present. This will ordinarily require upwards of three hours. The temperature of the solution throughout the hydrating and carbonating step should be maintained below 25° C., and preferably should be maintained between 10° and 20° C. When the temperature of the solution is kept below 20° C., the alkalinity remains at about 0.27 normal. While this alkalinity would give rise to considerable dicyandiamide formation at higher temperatures, with temperatures within the range stated substantially no dicyandiamide is formed.

When the carbonation is complete, as indicated by the disappearance of free lime, the resulting slurry is filtered. Practically all of the nitrogen originally contained in the calcium cyanamide is now contained in the insoluble residue which consists of calcium carbonate and an insoluble lime-nitrogen compound, probably calcium cyanamide carbonate. The filtrate, which contains less than 1% of the total nitrogen, may be returned to the carbonating tank 1 for treating a fresh batch of calcium cyanamide. The filter cake is now introduced into the tank 7, a small amount of water or filtrate from the filtering step just described is added to the filter cake, and the resulting sludge is heated at approximately 32° C. until decomposition of the carbonated lime-nitrogen compound is complete. During this heating step carbon dioxide is passed into the sludge in the same manner as described above. About 0.026 gal. of water or filtrate to each pound of calcium cyanamide originally taken is sufficient to insure complete solution of the cyanamide upon decomposition of the insoluble lime-nitrogen compound contained in the sludge. In this connection it is to be noted that the carbonated lime-nitrogen compound when decomposed yields a considerable volume of water of combination. It is for this reason and to reduce the volume of water present in the final urea solution that the filtering step above described is carried out. In lieu of this filtering step the separation by decantation or a simple thickening process of a portion of the water contained in the mixed carbonate sludge resulting from the treatment in tank 1 is not precluded.

When the decomposition of the lime-nitrogen compound is complete the resulting slurry or sludge is filtered. The filtrate is a cyanamide solution containing only a trace of dicyandiamide. This solution may be treated with the usual hydrolyzing agents for converting the cyanamide into urea.

I claim:

1. Process of preparing a cyanamide solution practically free from dicyandiamide which comprises treating calcium cyanamide with water and carbon dioxide while maintaining the temperature of the solution sufficiently low to prevent the formation of substantial amounts of dicyandiamide but at such temperature as will promote the precipitation of substantially all of the nitrogen as a carbonated lime-nitrogen compound, separating at least a portion of the water from the precipitate, moderately heating the residue in the presence of carbon dioxide to decompose the lime-nitrogen compound into cyanamide and calcium carbonate; and finally separating the cyanamide and carbonate.

2. Process of preparing a cyanamide solution practically free from dicyandiamide which comprises treating calcium cyanamide with water in the presence of carbon dioxide and at a temperature of from 10° to 20° C. until substantially all of the nitrogen is precipitated in the form of an insoluble carbonated lime-nitrogen compound, separating a portion of the water from the precipitate, heating the residue at about 32° C. while passing carbon dioxide thereinto to decompose the lime-nitrogen compound into cyanamide and calcium carbonate, and finally separating the cyanamide and carbonate.

3. Process of preparing a cyanamide solution practically free from dicyandiamide which comprises forming calcium cyanamide carbonate by treating calcium cyanamide with water and carbon dioxide while maintaining the temperature of the solution below 25° C., heating the carbonate at about 32° C. in the presence of carbon dioxide to convert the carbonate into cyanamide and calcium carbonate, and finally separating the cyanamide solution from the precipitated calcium carbonate.

In testimony whereof, I affix my signature.

ALBERT N. ERICKSON.